Sept. 16, 1952        G. E. HART        2,611,124
BLIND LANDING SYSTEM
Filed July 1, 1946        2 SHEETS—SHEET 2
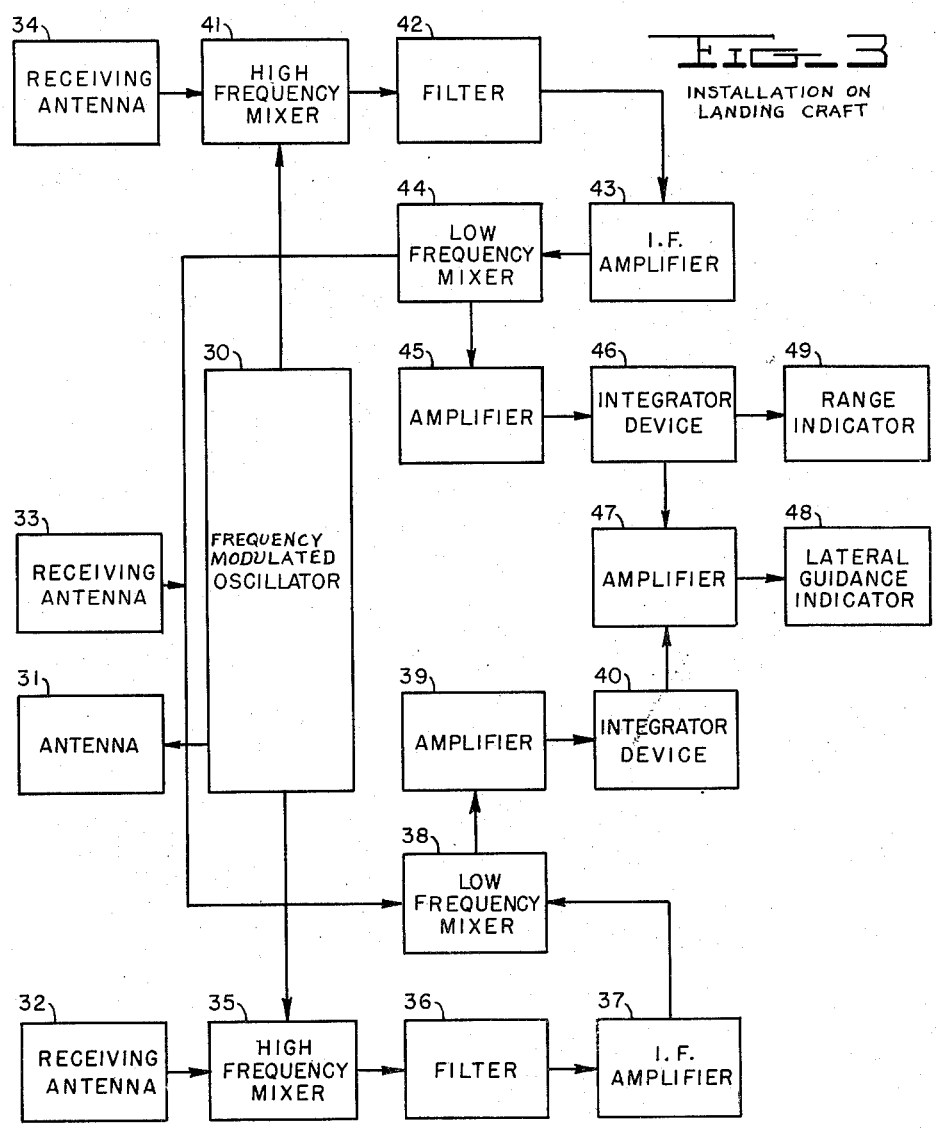
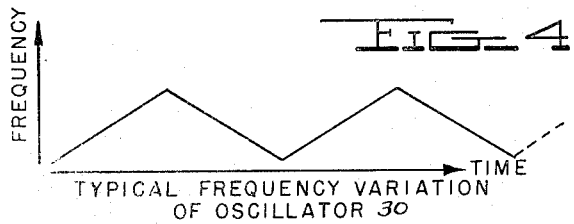
*INVENTOR.*
GERALD E. HART
BY
*ATTORNEY*

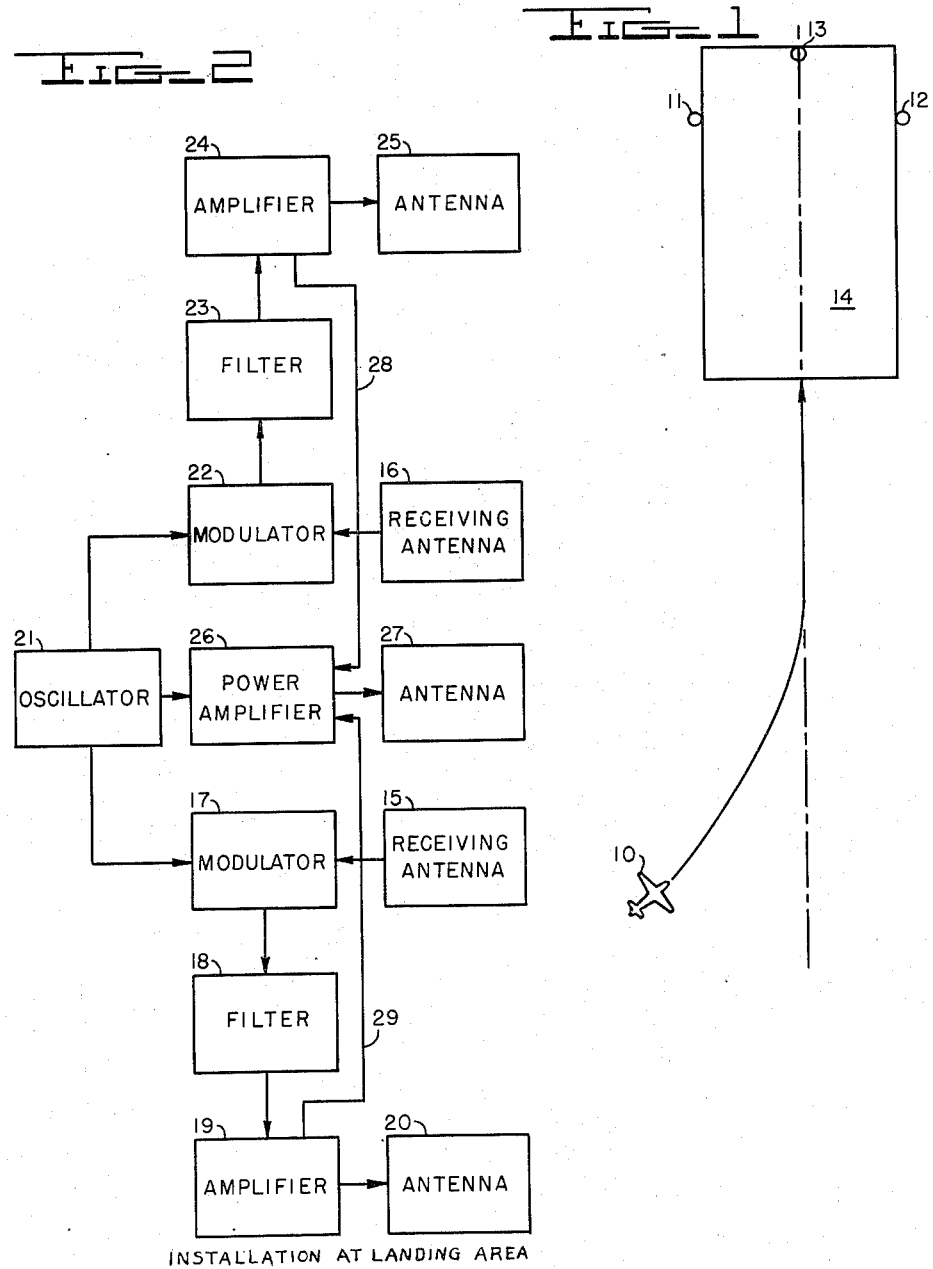

Patented Sept. 16, 1952

2,611,124

UNITED STATES PATENT OFFICE 2,611,124

BLIND LANDING SYSTEM

Gerald E. Hart, United States Navy

Application July 1, 1946, Serial No. 680,787

4 Claims. (Cl. 343—6)

(Granted under the act of March 3, 1883, as amended April 30, 1928; 370 O. G. 757)

This invention relates to blind landing approach systems, and in particular to systems for determining the azimuthal position of an aircraft relative to a landing strip while the aircraft is landing.

Various blind landing systems have been proposed and utilized in the past, however, these systems suffer from numerous disadvantages. In the systems employing continual emission of electrical energy in two beams for determination of the azimuthal position of an incoming aircraft the disadvantages are particularly objectionable. For such a system of continual emission the average power requirements are considerable. Furthermore, the characteristics of the individual radio beams must be maintained constant with respect to a horizontal plane to give true information. In a system designed for use aboard an aircraft carrier or other platform subject to motion, the difficulty of maintaining the beams constant in the horizontal plane is further aggravated by the motion of the platform which may cause rapid changes in the intensity of the signal received at the aircraft.

Accordingly it is an object of this invention to provide in a blind landing apparatus an azimuthal determination system having minimum power requirements, to indicate to the pilot of an approaching aircraft the azimuthal position of his craft with respect to the landing platform during a blind landing approach.

Another object of this invention is to provide a method for supplying lateral guidance during the flight of an aircraft.

A further object is to provide a system for accurately indicating the lateral position of an approaching aircraft relative to the landing platform.

A further object is to provide in a blind approach system an azimuthal determination system which can be employed to facilitate the landing of aircraft on a platform subject to motion.

Other and further objects and features of the present invention will become apparent upon a careful consideration of the following detailed description when taken together with the accompanying drawings which illustrate a typical embodiment of the invention and the manner in which that embodiment may be considered to operate.

In the drawings:

Figure 1 is a diagrammatic view showing the relative arrangement of major parts of a blind landing system constructed according to the principles of the present invention, shown also is a flight path followed by an aircraft in seeking a landing line midway between the side boundaries of the landing platform.

Figure 2 shows, in part features of one embodiment of the invention, components shown therein preferably comprising the installation in proximity to the landing platform.

Figure 3 shows, in part, additional features of the one embodiment of the invention, components shown therein preferably comprising the installation aboard the landing craft.

Figure 4 shows a typical chart showing how the frequency engendered by an oscillator used with this invention varies with time.

In accordance with the general concepts of the present invention a blind landing approach system is provided which will indicate to the pilot of an incoming plane the relative position of his aircraft with respect to a chosen dimension of the landing platform. Referring to Figure 1, radio frequency energy possessing definite and known modulation characteristics is radiated from an emitting device located in the aircraft 10. The radiated energy causes a plurality of responder transmitter devices 11, 12, and 13 located on the landing platform 14 to emit radio frequency energy having modulation characteristics differing from those of the transmitted energy. The return signals from the responder devices as received in the aircraft 10 are combined in such a way as to produce a control signal dependent on the location of the aircraft with respect to a line perpendicular to the line drawn through the locations of the responder devices 11 and 12. An indicator operable from the control signals may be employed to provide the pilot with convenient and accurate lateral guidance.

Referring now to Figure 2, a particular embodiment of the features of the invention is shown comprising components located in proximity to the landing platform 14 intended for the emission of signals in response to selected radio frequency signals from the aircraft 10. Frequency modulated energy having typically the variation characteristics as shown in Figure 4 is radiated from the aircraft 10 for interception by the receiving antennas 15, 16 of the responder devices 11 and 12. By way of example one of the beacons typified by 11 comprises a receiving antenna 15, modulator 17, filtering network 18, amplifier 19, and an antenna 20. Energy of the selected frequency emitted from the aircraft 10 is intercepted by the receiving antenna 15 and is applied to a balanced modulator 17. A lower frequency modulating signal of a reference frequency, derived from an oscillation generator 21 is also applied to the modulator 17. The balanced modulator produces an output signal in which the carrier and modulating frequencies are suppressed but in which the upper and lower side band frequency components are present. The output of the modulator 17 is applied to a frequency selective network or filter 18 adapted to pass only a selected band of frequencies, namely, the "sum" frequency sideband, and reject the "difference" frequency sideband. The "sum" frequency signals are amplified by a suitable power amplifier 19 and then applied to an antenna or radiating device 20 having omnidirectional characteristics for radiation to the incoming aircraft.

Similarly, energy emitted from the aircraft 10 is also received by antenna 16 and applied to a balanced modulator 22 where "sum" and "difference" frequency components of the incoming signal and a signal from oscillator 21 are produced. A filter 23 designed to permit the passage of the "difference" frequency sideband and reject the "sum" frequency sideband is employed to supply the "difference" frequency signal to amplifier 24. Power amplification by unit 24 produces radio frequency signals of sufficient power for omnidirectional radiation by the antenna 25.

A part of the reference frequency energy generated by oscillator 21 is applied to a third power amplifier 26 to produce energy for radiation by a third omnidirectional radiating antenna 27. This reference frequency energy is required in the aircraft receiving installation for proper evaluation of the signals emitted from responder devices 11, 12 as will be explained later. The exact location of the radiating antenna 27 is not of extreme importance.

To reduce the standby power consumption of the unit to a minimum it is desirable that the amplifiers 19 and 24 produce output signals only upon passage of the selected radio frequency energy through the filters 18 and 23, respectively. This is normally easy to realize with fixed-bias class B or C amplifiers. Still further reduction in the standby power consumption may be obtained by means of a single line or a pair of lines 28 and 29 interconnecting the power amplifiers so that amplifier 26 is operative only in the periods of operation of the amplifier 19, 24.

With reference to Figure 3 a typical arrangement of components of the invention installed in an aircraft is shown. When it is desired to obtain azimuthal information for landing, the normally inoperative device of Figure 3 is turned on. An energy source 30 is thereby set into operation to produce a radio-frequency signal bearing selected modulation, typically of frequency, which is coupled to an antenna 31 of any conventional type having directive radiation characteristics and so disposed on the aircraft to emit energy in a forward direction relative to the flight of the aircraft. This interrogation signal emitted from antenna 31 actuates the landing platform equipment 11, 12, 13 as previously described.

Energy radiated by the responder devices 11, 12, 13 in response to the energy received from source 30 is received at the aircraft installation by a multiple receiving system having the input channels or receiving antennas 32, 33, 34. These three channels are preferably tuned, respectively, to the frequency of the signals emitted by each of the antennas 20, 25, 27 and are designed to produce signals in dependency on the azimuthal position of the aircraft relative to the landing platform.

As typified by apparatus associated with the receiving antenna 32, which is tuned to respond to energy of the "sum" frequency sideband emitted by the antenna 20, received energy is supplied to a high frequency mixer 35 together with energy from source 30. High frequency mixer 35 produces "sum" and "difference" frequency components of the signals from antenna 32 and source 30. Following mixer 35 is a filter circuit 36 which is preferably tuned to respond to the "difference" frequency sideband in the mixer output. This "difference" frequency sideband is applied to an intermediate-frequency amplifier 37. Amplified signals from the amplifier 37, together with received signals of reference frequency from receiving antenna 33 are supplied to a low frequency mixer 38 resulting in the production of an audio frequency signal, the frequency of which is dependent on the distance of the aircraft 10 from the radiating antenna 20.

The exact method by which this audio frequency signal is produced is quite complex, the general method of production is along the following lines, typical frequencies being given.

A typical operating carrier frequency produced within the source 30 would be 3000 megacycles per second. This carrier signal is frequency modulated over a typical bandwidth of 40 mc. The modulated energy is received by the receiving antennas 15, 16 located near the landing platform causing the emission of energy by antennas 20, 25, 27. Antenna 27 returns energy at the frequency of the oscillator 21 which may be, typically, 200 mc. The energy returned by antenna 20 will be at a carrier frequency of 3200 mc. and still frequency modulated over a 40 mc. bandwidth. The energy returned by antenna 25 will be a carrrier frequency of 2800 mc., also frequency modulated over the 40 mc. bandwidth.

Energy received from antenna 20 through input channel 32 is combined in the high frequency mixer 35 with the frequency modulated 3000 mc. signal from source 30 to produce a 200 mc. signal without frequency modulation but having low frequency amplitude modulation because of instantaneous frequency differences between the modulation of the output of source 30 and that of the return signal due to the transmission delay in the paths between the aircraft and the landing platform.

The 200 mc. amplitude modulated carrier signal is combined in the low frequency mixer 38 with the 200 mc. signal from the oscillator 21 obtained through the receiving channel 33 to produce an audio frequency signal, the actual frequency of which is variable in dependency on the distance between the aircraft 10 and the responder device 11.

The audio frequency signal thus obtained is not used directly but is amplified in an audio frequency amplifier 39 to operate a suitable integrating device 40 which produces a signal in dependency on the frequency thereof. This integrated signal is compared with a similar signal obtained through apparatus associated with the input channel 34, namely, high frequency mixer 41, filter 42, intermediate frequency amplifier 43, low frequency mixer 44, amplifier 45 and the integrating device 46. The combination of these two integrated signals within an amplifier 47, which may be of the "D. C." type, produces an output indication on the lateral guidance indicator 48 to enable the pilot of the approaching aircraft 10 to determine his azimuthal position relative to the selected center line of the landing platform.

The frequencies involved in the circuits associated with channel 34 are treated in a manner similar to those in the circuits associated with channel 32. One important difference is present. The signal radiated by antenna 25 in response to a signal from the antenna 31 is of a frequency of 2800 mc. This signal is similarly converted to a 200 mc. without frequency modulation but having low frequency amplitude modulation in dependency on the distance between platform 14 and craft 10.

An indication of the distance between the landing platform 14 and the approaching craft 10 is readily obtained by the addition of a range indicator 49 which may operate from the output of either integrator device 40 or 46. Since the average frequency of the signals applied to amplifiers 39 and 45 varies with the distance between platform 14 and craft 10, the output signal from either integrator device will vary in direct dependency on this distance. The range indicator 49, operative to produce a usable signal in accordance with the integrator output signal is a useful addition to the landing equipment.

From the foregoing discussion it is apparent that considerable modification of the features of this invention is possible and while the device herein described and the form of apparatus for the operation thereof constitutes a preferred embodiment of the invention it is to be understood that the invention is not limited to this precise device and form of apparatus and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. In a radio directed approach system, azimuthal determination apparatus for indicating the position of an approaching craft relative to a selected line of approach to a particular locality, comprising; transmitting means aboard the craft for emitting a frequency varying radio frequency signal bearing selected variation characteristics, a first retransmitting means responsive to the radio frequency signal to emit a reference frequency signal, a second retransmitting means responsive to the radio frequency signal to produce a return signal of frequency equal to the sum of the radio frequency signal and the reference signal, a third retransmitting means physically removed from the second retransmitting means and responsive to the radio frequency signal to produce a return signal of requency equal to the difference between the radio frequency and reference signals, receiver means aboard the craft responsive to the energy from the retransmitting means, means operative from the output of the receiver means to produce first and second comparison signals in dependency on phase variation differences between the radio frequency signal and the signals returned by the second and third retransmitting means produced by differences in lengths of transmission paths, and means combining said comparison signals to produce an indication in dependency on the azimuthal position of the craft relative to the location of the second and third retransmitting means.

2. A radio directed approach system for accurately indicating the position of an approaching craft relative to a landing platform, comprising; energy transmitting means on the approaching craft for emitting energy having selected modulation characteristics, a first signal generator located in proximity to the landing platform producing a reference frequency signal, receiving means in proximity to the landing platform for intercepting and amplifying energy emitted by the transmitting means on the approaching craft, mixing means combining the signal from said last named means and the reference frequency signal, first and second return transmitter means radiating, respectively, and from first and second different localities of the landing platform, the sum and difference frequency components in the output from the mixing means, third return transmitter means for radiating the reference frequency signal, receiver means intercepting and amplifying the return signals, combining means responsive to the return signals deriving a first output signal in dependency on the distance of signal travel between the craft and of the radiation locality of the landing platform and a second output signal in dependency on the difference in the length of signal path between the craft and each of the first and second landing platform localities.

3. A radio directed approach system for accurately indicating the position of an approaching craft relative to a landing platform, comprising; energy transmitting means on the approaching craft for emitting energy having selected modulation characteristics, a first signal generator located in proximity to the landing platform producing a reference frequency signal, receiving means in proximity to the landing platform for intercepting and amplifying energy emitted by the transmitting means on the approaching craft, first mixing means combining the signal from said last named means and the reference frequency signal, first and second return transmitter means radiating, respectively, and from first and second different localities of the landing platform, the sum and difference frequency components in the output from the first mixing means, third return transmitter means for radiating the reference frequency signal, receiver means intercepting and amplifying the return signals, first high frequency mixing means combining the received signal from the first return transmitter means with the signal generated by the energy transmission means to produce a first beat signal of substantially the same frequency as the reference frequency signal but bearing modulation in dependency on the time delay of transmission between the craft and the first return transmitter means, first low frequency mixing means combining the received reference frequency signal with the first beat signal to produce a first intermediate output signal in dependency on the modulation of the first beat signal, second high frequency mixing means combining the received signal from the second return transmitter means with the signal generated by the energy transmission means to produce a second beat signal of substantially the same frequency as the reference frequency signal but bearing modulation in dependency on the time delay of transmission between the craft and the second return transmitter means, second low frequency mixer means combining the received reference frequency signal with the first beat signal to reproduce a second intermediate output signal in dependency on the modulation of the second beat signal, and integrator means combining the first and second intermediate output signals to produce a distance indication in proportion to the distance between the craft and the return transmitter means and an azimuth indication in dependency on the difference in the distances between the craft and each of the first and second return transmitter means.

4. In a radio directed approach system, azimuthal determination apparatus for indicating the position of an approaching craft relative to a selected line of approach to a landing area comprising; transmitting means aboard the craft for emitting a frequency varying radio frequency signal bearing selected variation characteristics, a retransmitting means located at the landing area and operative in response to the radio frequency signal to emit a reference frequency signal, a second signal equal to the sum of the radio frequency signal and the reference frequency signal, and a third signal equal to the difference between the radio frequency signal and reference signal, receiver means aboard the craft responsive to the energy from the retransmitting means, means operative from the output of the receiver means to produce first and second comparison signals in dependency on phase variation differences between the radio frequency signal and the second and third signals produced by differences in lengths of transmission paths, and means combining said comparison signals to produce an indication in dependency on the azimuthal position of the craft relative to the location of the retransmitting means.

GERALD E. HART.

REFERENCES CITED

The following references are of record in the file of this patent:

UNITED STATES PATENTS

| Number | Name | Date |
|---|---|---|
| 2,231,698 | Nolde | June 15, 1943 |
| 2,405,238 | Seeley | Aug. 6, 1946 |
| 2,405,239 | Seeley | Aug. 6, 1946 |
| 2,413,694 | Dingley | Jan. 7, 1947 |
| 2,427,219 | Luck | Sept. 9, 1947 |
| 2,436,846 | Williams | Mar. 2, 1948 |
| 2,524,050 | Ginzton | Oct. 3, 1950 |
| 2,528,119 | Crosby | Oct. 31, 1950 |
| 2,546,973 | Chatterjea | Apr. 3, 1951 |